US00RE43052E

(19) United States
(12) Reissued Patent
Kim

(10) Patent Number: US RE43,052 E
(45) Date of Reissued Patent: Dec. 27, 2011

(54) GRAPHIC INTERFACE DEVICE AND METHOD IN DIGITAL TV

(75) Inventor: Jeong Min Kim, Seoul (KR)

(73) Assignee: LG Electronics Inc., Seoul (KR)

(21) Appl. No.: 11/222,487

(22) Filed: Sep. 9, 2005

Related U.S. Patent Documents

Reissue of:
(64) Patent No.: 6,618,057
Issued: Sep. 9, 2003
Appl. No.: 09/522,917
Filed: Mar. 10, 2000

(30) Foreign Application Priority Data

Mar. 10, 1999 (KR) ..... 1999/7953

(51) Int. Cl.
*G06F 13/00* (2006.01)
*G09G 5/00* (2006.01)

(52) U.S. Cl. ..... 715/719; 725/40

(58) Field of Classification Search ..... 715/719, 715/762, 835–837, 763–765; 725/60, 41, 725/45

See application file for complete search history.

(56) References Cited

U.S. PATENT DOCUMENTS

| | | | | |
|---|---|---|---|---|
| 5,659,793 | A | 8/1997 | Escobar et al. | |
| 5,666,293 | A | 9/1997 | Metz et al. | |
| 5,894,320 | A | 4/1999 | Vancelette | |
| 6,005,562 | A | 12/1999 | Shiga et al. | |
| 6,029,045 | A | 2/2000 | Picco et al. | |
| 6,034,677 | A | 3/2000 | Noguchi et al. | |
| 6,172,677 | B1 | 1/2001 | Stautner et al. | |
| 6,201,538 | B1 | 3/2001 | Wugofski | |
| 6,339,842 | B1 * | 1/2002 | Fernandez et al. | 725/133 |
| 6,396,531 | B1 * | 5/2002 | Gerszberg et al. | 348/14.01 |
| 6,415,437 | B1 * | 7/2002 | Ludvig et al. | 725/41 |
| 6,433,800 | B1 | 8/2002 | Holtz | |
| 6,462,760 | B1 | 10/2002 | Cox, Jr. et al. | |
| 6,469,723 | B1 | 10/2002 | Gould et al. | |

FOREIGN PATENT DOCUMENTS

| | | |
|---|---|---|
| JP | 10-304320 | 11/1998 |
| KR | 1997-0078654 | 12/1997 |

OTHER PUBLICATIONS

Microsoft Windows NT®, © 1998 3 screen shots—1) "<file-name> Properties" dialog box, 2) "Change Icon" dialog box, 3) "About Windows" dialog box.*

* cited by examiner

*Primary Examiner* — Cao "Kevin" Nguyen
(74) *Attorney, Agent, or Firm* — Birch, Stewart, Kolasch & Birch, LLP

(57) ABSTRACT

A graphic interface device and method in a digital TV. The graphic interface device includes: a transmitting side for coding various forms of user graphic environment which can be selected by an end user, assigning specific packet identification (PID), and multiplexing the assigned PID with video information, audio information and additional information; and a receiving side for parsing and decoding the various forms of graphic environment data of the specific PID transmitted from the transmitting side to be displayed on a screen, thereby being selected by the end user and for parsing and decoding once again the corresponding graphic environment selected by the end user to be displayed on the screen. Thus, the end user can select the graphic environment satisfying his own preference, for example, a dynamic program guide pattern or menu icon.

21 Claims, 8 Drawing Sheets

GRAPHIC INTERFACE DEVICE AND METHOD IN DIGITAL TV

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a digital TV, and more particularly, to a graphic interface device and method in a digital TV.

2. Description of the Background Art

As the video media are recently digitized, cable broadcasting or satellite broadcasting using an analog method becomes digitized, with a consequence that the conventional analog media will be replaced with the digital media.

Owing to the digitization of the broadcasting, users who enjoyed a small number of existing channels can possess a large number of channels and programs of a high quality of image.

In addition, a user graphic program guide is provided for the convenience of the users, with which they can read the information on the large number of channels and select desired programs.

FIG. 1 shows an example of conventional user graphic interface environment. Typically, this is provided by a set-top box manufacturer or a program power providing an application software such as graphic environment. Since, however, the use, graphic interface environment as shown in FIG. 1 is in 3 single form, it is static and passive when viewed in the user's position. In other words, the user can select desired channels and programs under the service of the single and set form of use graphic environment provided by the above-described manufacturer or program provider.

It can be, therefore, understood that the conventional user graphic interface environment fails to provide the graphic interface satisfying a user's preference.

SUMMARY OF THE INVENTION

An object o the invention is to provide a graphic interface device and method in a digital TV capable of providing various forms of user graphic environment Another object of the invention is to provide a graphic interface device and method in a digital TV capable of inserting and transmitting various forms or program guides on a stream at a transmitting side and parsing the transmitted program guides and decoding the parsed information to display the decoded result at a receiving side, thereby providing user graphic environment satisfying a user's preference.

To attain these objects described above, according to an aspect of the present invention, there is provided a graphic interface device in a digital TV which comprises: a receiving side for receiving various forms of user graphic environment which can be selected by a user, which are coded, assigned with specific packet identification (hereinafter, referred to as 'PID'), and multiplexed with video information, audio information and additional information at a transmitting side; and a graphic interfacing side for parsing and decoding the various forms of graphic environment data of the specific PID received at the receiving side to be displayed on a screen for selection by the user, and for parsing and decoding once again only the corresponding graphic environment selected by the user to display it on the screen.

According to an embodiment of the invention, the PID, which is assigned to the user graphic environment at the transmitting side, is distinguished from a PID each assigned to the video information, the audio information and the additional information.

To attain these objects described above, according to another aspect of the present invention, there is provided a graphic interface method in a digital TV which comprises the steps of: if various forms of user graphic environment to be selected by a user, which are coded, assigned with specific PID, and multiplexed with video information, audio information and additional information, are transmitted by a transmitting side, receiving the various kinds of user graphic environment from the transmitting side; and parsing and decoding the various kinds of graphic environment data of the specific PID to be displayed on a screen, thereby being selected by the user, and parsing and decoding once again only the corresponding graphic environment selected by the user to be displayed on the screen.

According to an embodiment of the invention, the displaying step comprises the steps of: if a program guide, in an environment set menu which can be selected by the user, has been selected by the user, parsing the stream of the assigned PID to the selected program guide; decoding the parsed stream to store various forms of program guide patterns in a memory; performing a (graphic user interface (hereinafter, referred as 'GUI') process for the various forms of program guide patterns to be thereby displayed in an on screen display (hereinafter, referred to as 'OSD') fashion; if any one of the various forms of program guide patterns has been selected by the user, parsing the stream of the assigned PID to the selected program guide pattern; decoding the parsed stream to store the corresponding program guide pattern in the memory; and displaying only the corresponding program guide pattern stored in the memory in the OSD fashion.

According to an embodiment of the invention, the displaying step comprises the steps of: if a menu icon, in an environment set menu which can be selected by the user, has been selected by the user, parsing the stream of the assigned PID to the selected menu icon; decoding the parsed stream to store various forms of menu icons in a memory; performing a GUI process for the various forms of menu icons and text forms of indication menu names which are to be set as the menu icons to be displayed in a menu form; if respective ones of the various forms of menu icons and indication menu names have been selected by the user, parsing the stream of the assigned PID to the selected icon; decoding the parsed stream to store the corresponding icon in the memory; and replacing the selected indication menu name with the corresponding icon and displaying the replaced icon.

It is to be understood that both the foregoing general description and the following detailed description are exemplary and explanatory and are intended to provide further explanation of the invention as claimed.

BRIEF DESCRIPTION OF THE DRAWINGS

Other objects, advantages and details of the graphic interface device and method of this invention appear in the following detailed description o: preferred embodiments of the invention, the detailed description referring to the drawings in which.

DESCRIPTION OF PREFERRED EMBODIMENTS

The present invention will now be described with reference to the illustrated embodiments.

The present invention is aimed to provide various forms of user graphic interface environment, thereby allowing the range of the selection by the user to be widened. In one preferred embodiment of the present invention, as various forms of program guide patterns are provided, a desired program guide pattern of the user can be displayed, together with the program and channel information that is transmitted as additional information. Additionally, in another preferred embodiment of the present invention, as various forms of identification figures, e.g. icons are provided, the indication menu can be replaced with a desired icon of the user.

Figure 1:
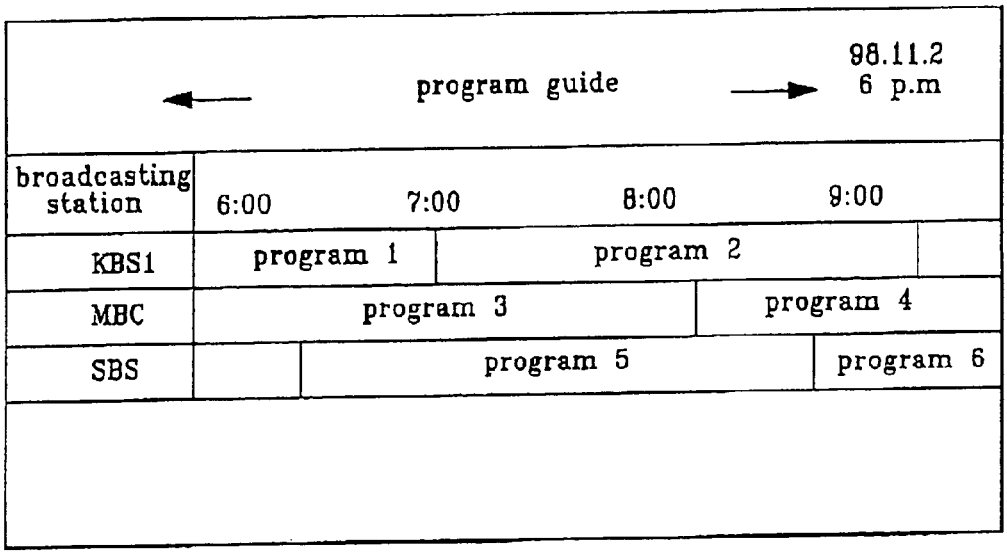
FIG.1 Related Art
FIG. 1 is an exemplary view illustrating a prior art user program guide.
Figure 2:
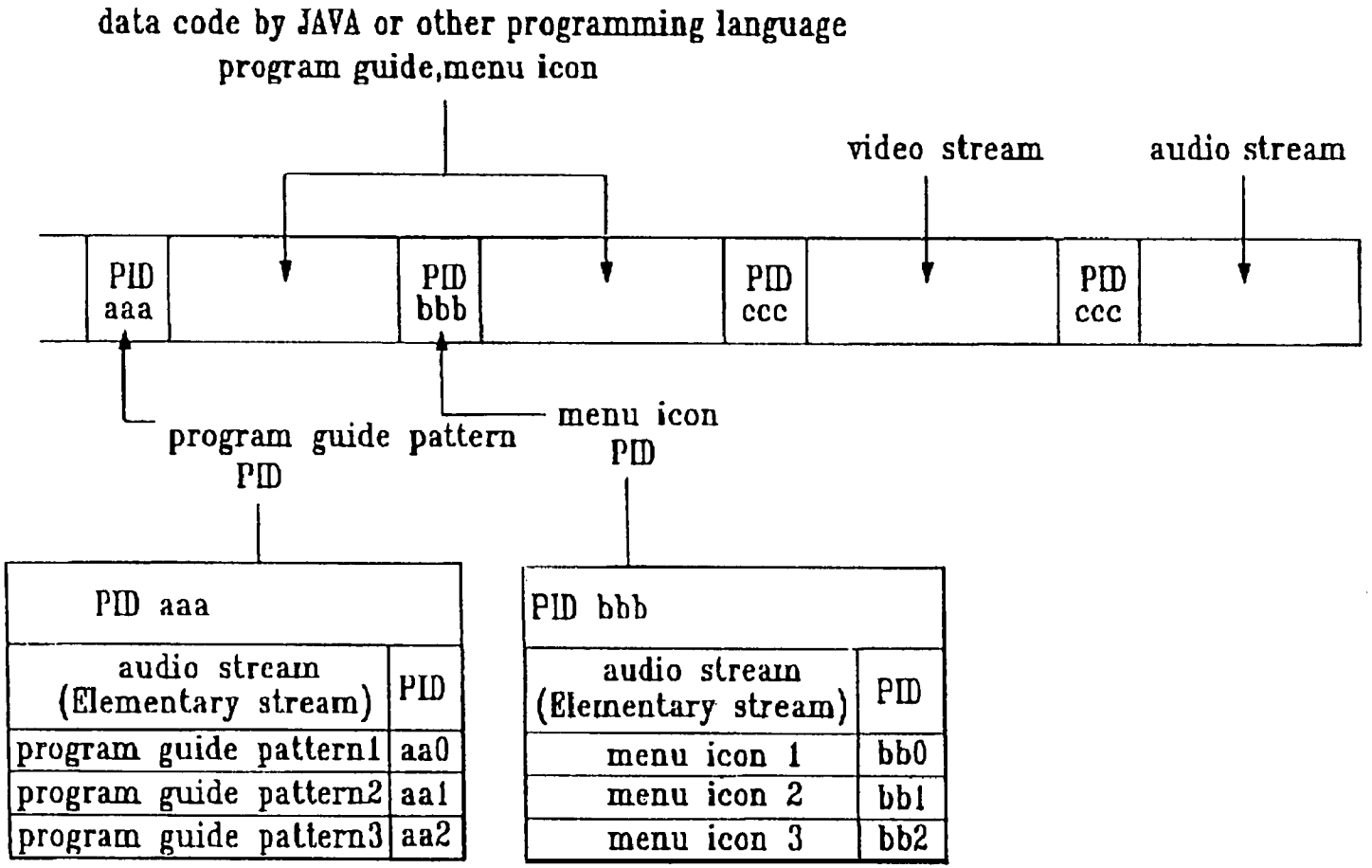
FIG. 2 is an exemplary view illustrating the structure of a transport stream according to an embodiment of the present invention.

FIG. 2 is an exemplary view illustrating the structure of transport stream according to an embodiment of the present invention. The PID assigned to the additional information such as existing video/audio and program guide data is the same as in conventional practice. But in the present invention, the PIDs are assigned to one program guide patterns and menu icons and are distinguished from the existing PIDs. The program guide data differs from the program guide pattern. That is to say, the program guide data is the information on the real program and channel, but the program guide pattern is a type of container for displaying the program guide data.

By way of example, the program guide pattern is embodied by various forms of patterns such as grid, matrix, is, banner or the like, for example.

Conventionally, the transmission format of the digital TV broadcasting is an MPEG 2 transport stream. The transport stream is divided into a header part and a payload part. The header part contains the information informing the start of a signal and the PID indicating the type of the signal loaded on the payload part. The payload part contains the video/audio information, additional information, program guide pattern, and menu icon information, as will be transmitted.

If the PID is parsed, therefore, it is distinguished whether the current packet is a video packet, an audio packet or an additional information packet. It can be also distinguished whether the current packet is the program guide pattern or the menu icon according to the present invention.

At this time, the program guide pattern and the menu icon loaded on the payload part are the data (for example, the code providing graphic environment) coded by Java or other programming language, for the compatibility with existing set-top application.

Figure 3:
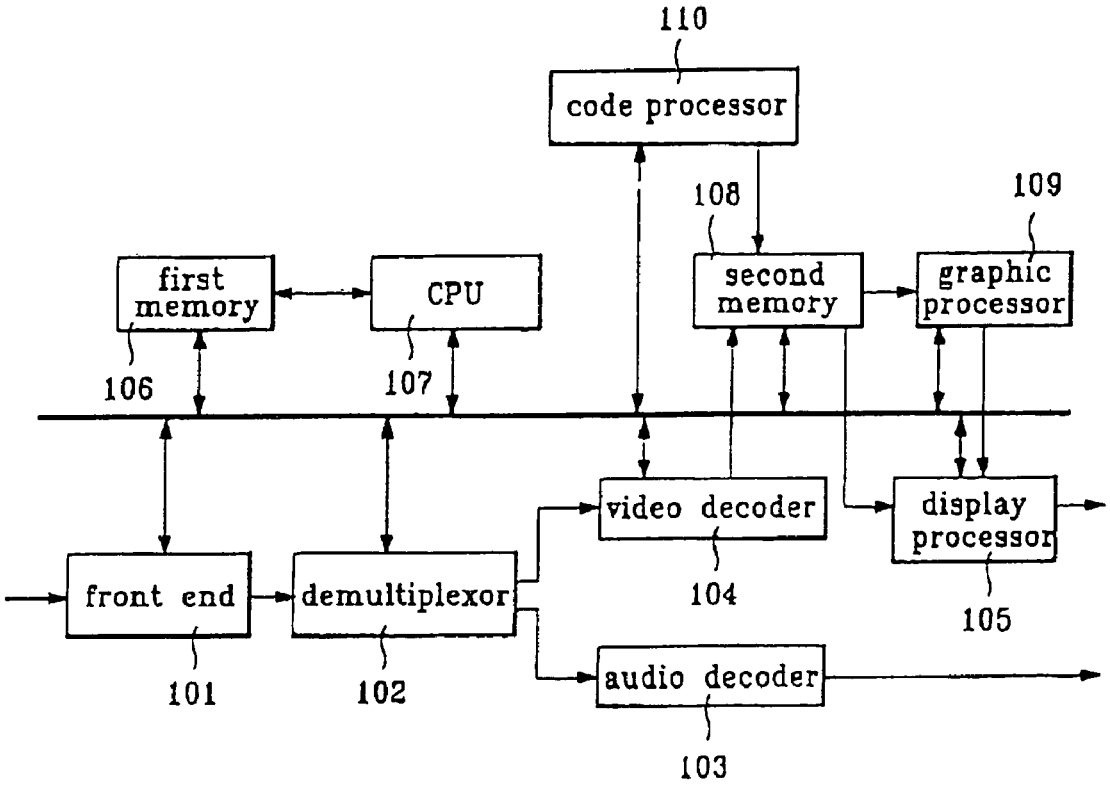
FIG. 3 is a block diagram illustrating one preferred embodiment of the graphic interface device of a digital TV according to the present invention.

FIG. 3 is a block diagram illustrating one preferred embodiment of the graphic interface device of a digital TV according to the present invention. As shown, the graphic interface device includes: a front end 101, which is a receiving side *or receiver*, for pre-processing an input signal being transmitted to output a transport stream; a demultiplexor 102 for demultiplexing the pre-processed transport stream from the front end 101 to separate it into video/audio signals, program guide pattern data and menu icon information; an audio decoder 103 for decoding the audio signal separated in the demultiplexor 102; a video decoder 104 for decoding the video signal separated in the demultiplexor 102; a first memory 106 for storing an operation program; a central processing unit (CPU) 107 for decoding the data of a specific PID separated in the demultiplexor 102 in accordance with the operation program of the first memory 106; a second memory 108 for storing the program guide pattern/menu icon data decoded in the CPU 107; a graphic processor 109 for reading the program guide pattern/menu icon data stored in the second memory 108 in accordance with a control signal of the CPU 107 and graphic-processing the read program guide pattern/menu icon data; and a display processor 105 as a graphic interfacing side for controlling the display of the data processed in the video decoder 104 or the graphic processor 109.

The graphic interface device further includes a code processor 110 for processing the programming language or JAVA code which is not processed in the CPU 107. All the components of the graphic interface device are operatively coupled. In the case where the programming language is processed in the CPU 107, the code processor 110 is not required.

For instance, if the program guide pattern/menu icon data which have been coded to the Java code are not decoded in the CPU 107, the code processor 110 inputs the Java code stream related to the program guide pattern/menu icon data from the CPU 107, decodes the input result to be matched to Java syntax, and stores the decoded data in the second memory 108.

Under the construction as mentioned above, the front end 101 receives the transport stream transmitted in such a form as shown in FIG. 2, modulates the received transport stream, corrects errors in the modulated stream, and outputs the error-corrected stream to the demultiplexor 102. Upon input of the time-multiplexed transport stream, the demultiplexor 102 performs the demultiplexing for the input transport stream. In such a case, the term 'demultiplexing' means that the transmitted transport stream is checked, so that the transport stream may be separated into a video signal stream, an audio signal stream, a program guide pattern signal stream, and a menu icon signal stream, and the like.

At this time, the separated audio signal stream is outputted to the audio decoder 103 and the separated video signal stream is outputted to the video decoder 104. In such a case, the video signal stream and the audio signal stream have been compressed upon coding in the transmitting side. The audio decoder 103 decodes the audio signal stream to be restored to an original digital audio signal and then converts the restored digital audio signal into an analog signal, thereby being sent to the outside via a speaker. The video decoder 104 decodes the video signal stream to be restored to an original digital video signal and then stores the restored digital video signal to the second memory 108. At this time, the display processor 105 reads the video signal decoded in the video decoder 104 and then stored in the second memory 108 and encodes the read signal to an NTSC signal to be thereby displayed on a display unit such as TV, PC monitor, etc. At this time, the display processor 105 can encode the decoded digital signal to a PAL or SECAM signal in accordance with broadcasting area.

Meanwhile, as the program guide pattern signal stream and the menu icon signal stream, separated from tile demultiplexor 102, have been compressed, they are outputted to the CPU 107. In this case, the CPU 107 decodes the program guide pattern signal stream and the menu icon signal stream parsed from the demultiplexor 102 in accordance with the operation program or outputs the streams to the code processor 110.

At this time, in the case where it is possible to decode the program guide pattern signal stream and the menu icon signal stream in the CPU 107, the streams are decoded to be restored to their original digital signals and then stored in the second memory 108. On the contrary, in the case where this is not possible, the streams are outputted to the code processor 110. In such a case, the code processor 110 decodes the program guide pattern signal stream and the menu icon signal stream to be restored to their original digital signals and then stores the restored signal in the second memory 108.

At this time, the graphic processor 109 performs a GUI process or the various forms of program guide patterns or menu icons stored in the second memory 108 En order for the user to select a desired pattern or icon. Thereafter, the display processor 105 displays the GUI processed result in the OSD fashion.

Figure 5A:
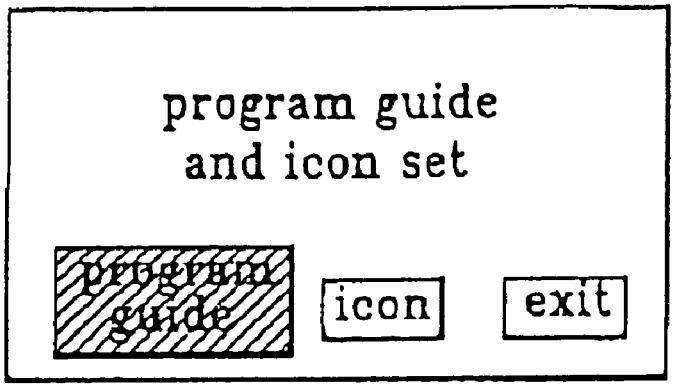
FIGS. 5A and 5E are exemplary views illustrating an example on the screen of the program guide selection process in FIG. 4.

To this end, if a set-top environment set menu is selected by the user, the set-top environment set menu as illustrated in FIG. 5A is displayed. In this case, a set-top environment set menu select process, a menu type and a display method are dependant to a designer.

Figure 5B:
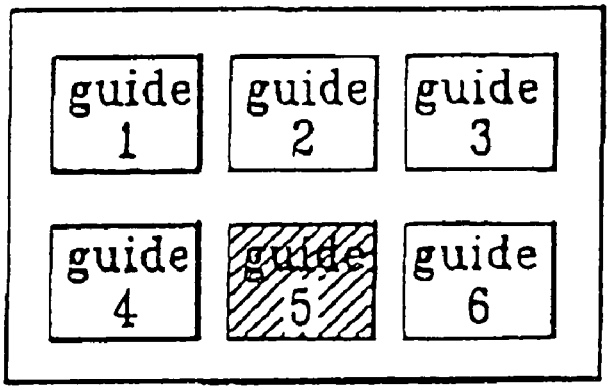

At this time, if either the program guide or the icon in the set-top environment set menu is selected by the user, the signal stream corresponding to the PID assigned to the selected one parsed at the demultiplexor 102, decoded in the CPU 107 or the code processor 110, and When stored in the second memory 108. By way of example, if the program guide in the menu screen as shown in FIG. 5A has been selected, the various forms of program guide patterns stored in the second memory 108 are displayed, through the graphic Processor 109 and the display processor 105, on the screen as shown in FIG. 5B. Contrarily, if the icon in the menu screen as shown in FIG. 5A has been selected, the various forms of menu icons stored in the second memory 109 are displayed, through the graphic processor 109 and the display processor 105, on the screen as shown in FIG. 7B.

That is, the graphic processor 109 performs a GUI process for the various forms of program guide patterns or men icons stored in the second memory 108 under the control of the CPU 107 and outputs the GUI processed result in the OSD fashion to the display processor 105. In this case, the display processor 105 displays the output result to be matched with an output format thereof.

Figure 4:
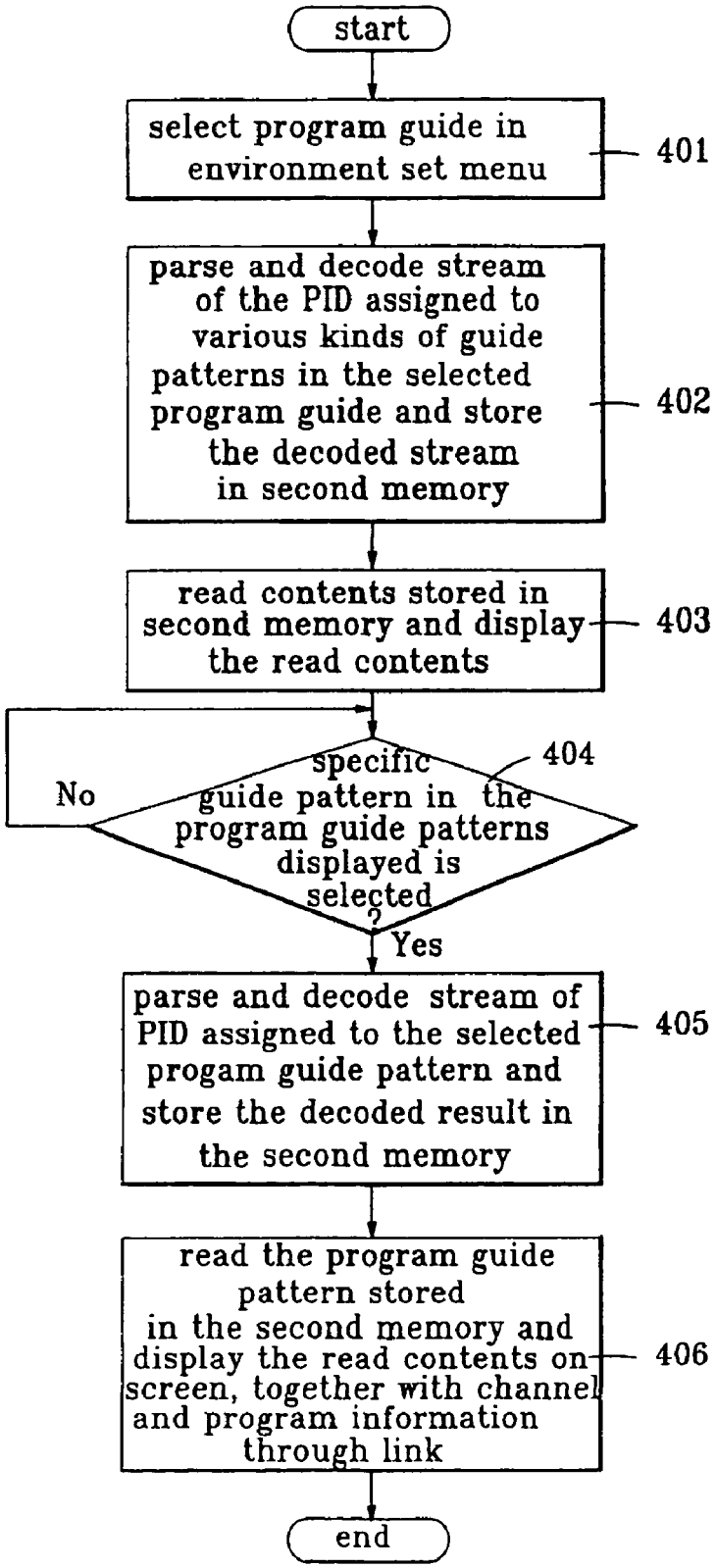
FIG. 4 is a flowchart illustrating a program guide selection process in FIG. 3 according to an embodiment of the present invention.
Figure 6:
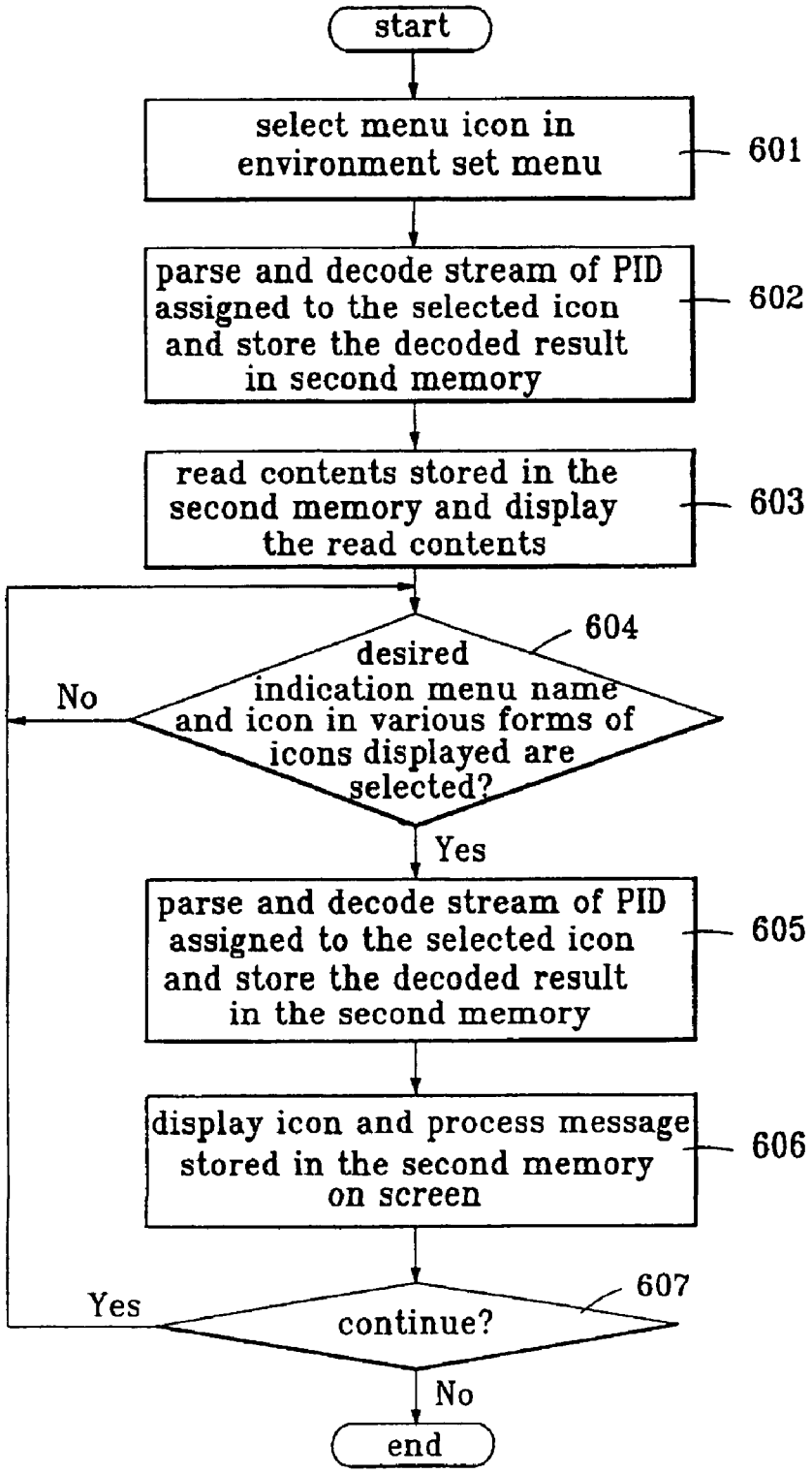
FIG. 6 is a flowchart illustrating a menu icon selection process in FIG. 3 according to an embodiment of the present invention.

Referring to the drawings, FIG. 4 is a flowchart illustrating a program guide selection process according to an embodiment of the invention, and FIG. 6 is a flowchart illustrating an icon selection process according to an embodiment of the invention. These processes are implementable in the device shown in FIG. 3.

First, an explanation ok an operation order upon program guide selection will be discussed with reference to FIG. 4 and FIGS. 5A and 5B.

At step 401, if the program guide in the environment set menu as shown in FIG. 5A has been selected by the user, the stream of the PID assigned to the various forms of guide patterns in the selected program guide is parsed in the demultiplexor 102 and then outputted to the CPU 107. If it is possible to decode the inputted stream in the CPU 107, the stream is decoded, but if it is not possible, the stream is outputted to the code processor 110 and then decoded. In this case, the decoded signal in the CPU 107 or the code processor 110 is stored in the second memory 108 as the various forms of program guide pattern data, at step 402. At this time, the graphic processor 109 performs the GUI process for the various forms of program guide patterns stored in the second memory 108 and displays the GUI processed result through the display processor 105, as shown in FIG. 5B. In other words, the graphic processor 109 performs the GUI process for the various forms of program guide patterns stored in the second memory 108 in accordance with the control signal of the CPU 107, and the display processor 105 reduces the GUI processed result to a predetermined size to output the reduced result to the display unit.

Referring to FIG. 5B, the various forms of program guide patterns (for example, program guide 1 through program guide 6) are displayed, any one of which can be selected by the user by using an input device. At this time, each of the program guide patterns is graphic-processed to a corresponding figure or text-processed for the purpose of being checked by the eyes of the user. Moreover, the program guide patterns may be displayed on several screens. The method for displaying the various forms of program guide patterns is varied depending upon the designer. The displaying methods which can be understood by the user are contemplated.

In such a case, other types of input devices may be used, if they can select any one of the contents displayed on the screen. For example, the input device may be a remote controller or a panel device integrally attached on the digital TV or the set-top box. Otherwise, it may be a keyboard or mouse with a wired or wireless connection to the digital TV or the set-top box.

At step 404, it any one (for example, program guide 5) of the program guide patterns displayed as shown in FIG. 5B has been selected by the manipulation of the input device, the stream of the PID assigned to the selected program guide pattern is parsed in the demultiplexor 102. At this tire, the demultiplexor 102 parses the stream of the PID assigned to the selected program guide pattern under the control of the CPU 107.

At step 405, the parsed stream in the demultiplexor 102 is decoded in the CPU 107 or the code processor 110 and then stored in the second memory 108. Next, the graphic processor 109 performs the graphic process for the corresponding program guide pattern stored in the second memory 108 and the display processor 105 displays the graphic processed contents on the screen. At this time, the additional information related to the channel and program through link is displayed on the displayed program guide pattern, at step 406. For instance, if the selected program guide pattern is the grid, the additional information related to he channel and program is displayed on the screen in the grid form of program guide pattern. On the other hand, if the selected program guide pattern is the list, the additional information related to the channel and program is displayed on the screen in the list form of program guide pattern.

As a consequence, the user can select the program guide pattern satisfying his own preference and obtain program guide information on the selected program guide pattern.

Next, an explanation of an operation order upon icon selection will be discussed with reference to FIGS. 6 to 8.

Figure 7A:
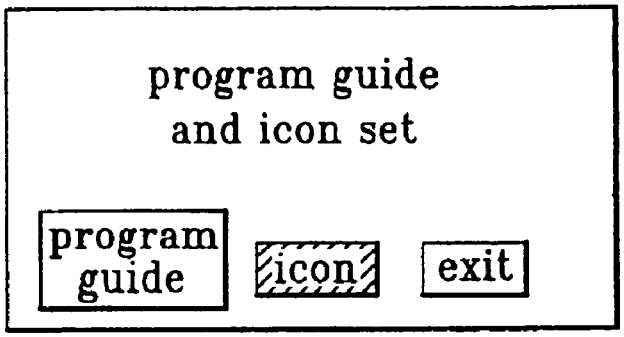
FIGS. 7A to 7C are exemplary views illustrating an example on the screen of the menu icon selection process in FIG. 6.
Figure 7B:
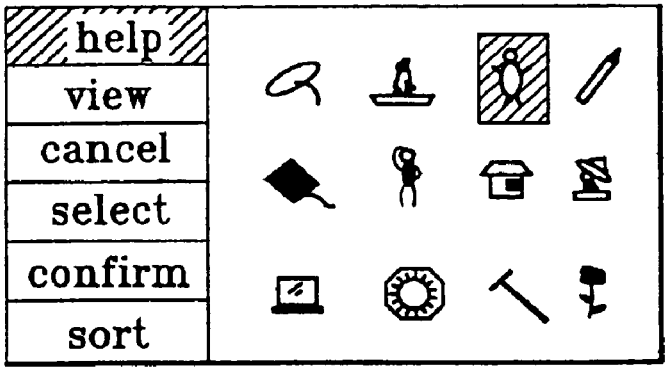

At step 601, if the icon in the environment set menu as shown in FIG. 7A is selected by the user, the stream of the PID assigned to the selected icon is parsed in the demultiplexor 102 and then outputted to the CPU 107. If it is possible to decode the inputted icon stream in the CPU 107, the icon stream is decoded, but if it is not possible, the icon stream is outputted to the code processor 110 and then decoded. In this case, the decoded signal in the CPU 107 or the code processor 110 is stored in the second memory 108 as the various forms of icon data, at step 602. At this time, the graphic processor 109 performs the GUI process for the various forms of icon data stored in the second memory 108 and displays the GUI processed result through the display processor 105, as shown in FIG. 7B, at step 603.

Referring to FIG. 7B, the text-type of indication menu names are displayed at the left-hand side screen and the various forms of icons are displayed at the right-hand side screen. Accordingly, the user can replace the indication menu names with the icons of his desired forms. To this end, the user selects the text-type of indication menu name and the icon to be assigned to the indication menu name by means of the input device.

At this time, the icons and the text-type of indication menu names are added or deleted by the designer and the display method thereof is also varied. Furthermore, the method for displaying the indication menu names and the icons can be varied. Other menu names other than the indication menu names can be replaced with the icons. In one embodiment of the present invention, the indication menu names as shown in FIG. 7B are replaced with the icons.

For example, at step 604 if the corresponding indication menu name and the icon to be assigned thereto on the screen as shown in FIG. 7B have been selected by the manipulation of the input device, the stream of the PID assigned to the selected icon is parsed in the demultiplexor 102 under the control of the CPU 107 and then outputted to the CPU 107. In the case where it is possible to decode the selected icon signal stream in the CPU 107, the stream is decoded and then stored in the second memory 108, at step 605. To the contrary, in the case where this is not possible, the stream is outputted to the code processor 110. In this case, the code processor 110 decodes the icon signal stream and then stores the decoded signal in the second memory 108, at step 606.

Figure 7C:
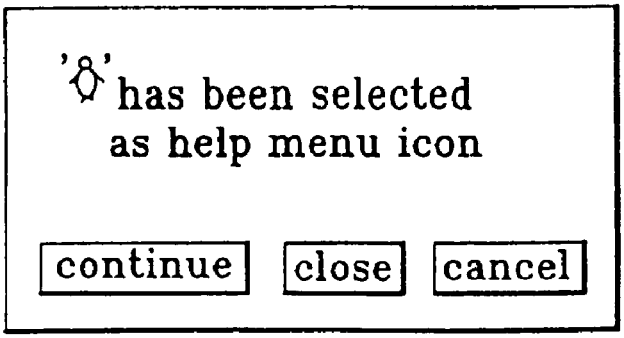

At this time, in order for fine user to check the selected, indication menu name and icon, the message screen as shown in FIG. 7C is displayed. If a continue button is selected, it returns to the step 604 to select another indication menu name and the corresponding icon, at step 607.

Figure 8:
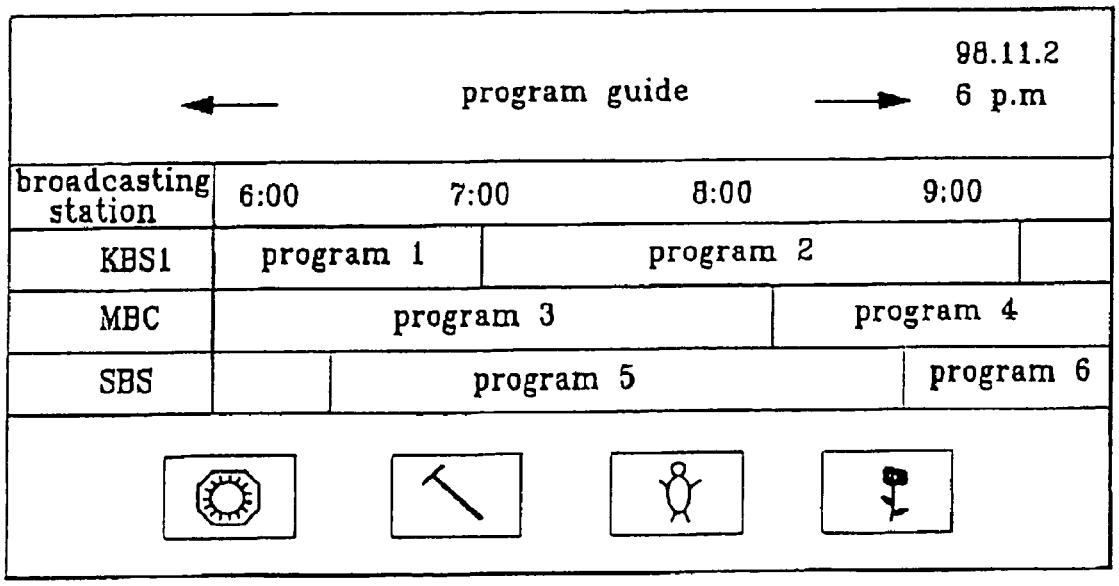
FIG. 8 is an exemplary view illustrating the state where an indication menu is replaced with an icon by the menu icon selection process in FIG. 6.

If under the above process the icon corresponding to each indication menu name is set, the indication menu names are replaced with the icons, as shown in FIG. 8. At this time, as the user selects (or clicks) only the corresponding icon by the manipulation of the input device, the corresponding operation to the selected indication menu name is carried out.

By way of summary, according to an embodiment of the invention, a graphic interface device and method of a digital TV comprises a transmitting side for inserting and transmitting various forms of program guide patterns or icons on a transport stream and a receiving side for parsing the transmitted stream, such that a user can select or design a particular user-preferred, user graphic environment satisfying his preference. In this case, it becomes easier to update the graphic environment such as, for example, the program guide patterns or menu icons. More specifically, even the program provider supplying an application software like the graphic environment can provide new graphic environment, if necessary.

Therefore, the user can select the graphic environment satisfying his own preference, for example, a dynamic program guide pattern or menu icon. Thereby, he can be very familiar to and have strong interest in the graphic interface environment.

On the other hand, if the memory capacity within the set-top box is large, the various forms of program guide patterns and icons can be stored in the memory upon manufacturing the set-top box. In this case, since the various forms of program guide patterns and icons are set upon manufacturing the set-top box, the updating of these forms may not be possible in some cases.

In addition, the graphic interface device of the digital TV according to the present invention can be applicable to a digital satellite or cable set-top box and may be applicable to any broadcasting using the digital media.

It will be apparent to those skilled in the art that various modifications and variations can be made in a graphic interface device and method in a digital TV of the present invention without departing from the spirit or scone of the invention. Thus, it is intended that the present invention cover the modifications and variations of this invention provided they come within the scope of the appended claims and their equivalents.

What is claimed is:

1. A graphic interface device usable in a digital TV, comprising:

a receiving side for receiving user graphic environment data corresponding to various forms of user graphic environments [displayable on a screen], the user graphic environment data including icon data corresponding to various icons; and a graphic interfacing side for [parsing and decoding] *processing* the user graphic environment data received at the receiving side, and allowing an end user to design a user-preferred user graphic environment including at least one user-defined icon [using the user graphic environment data], wherein the graphic interfacing side displays an environment set menu, such that any one of the various forms of user graphic environments can be selected by the end user; and wherein said user graphic environment data are assigned with specific packet identifications (PIDs), and said displaying of the menu comprises:

if a menu icon, in the environment set menu which can be selected by the end user, has been selected by the end user, parsing a data stream associated with the PIDs corresponding to various forms of menu icons;

decoding the parsed stream to store the various forms of menu icons in a memory;

performing a graphical user interface (GUI) process for the various forms of menu icons and text type of indication menu names which are to be set as the menu icons to be displayed in a menu fashion;

if respective ones of the various forms of menu icons and the indication menu names have been selected by the end user, parsing a stream associated with the PID assigned to the selected icon;

decoding the parsed stream to store the corresponding icon in the memory; and replacing the selected indication menu name with the corresponding icon and displaying the replaced icon.

2. The graphic interface device according to claim 1, wherein said user graphic environment data include program guide pattern data corresponding to various forms of program guide patterns.

3. The graphic interface device according to claim 1, wherein said user graphic environment data include data corresponding to various forms of identification figures.

4. The graphic interface device according to claim 1, wherein said user graphic environment data are coded, assigned with specific packet identifications (PIDs), and multiplexed with video information, audio information and additional information at a transmitting side.

5. The graphic interface device according to claim 4, wherein said PIDs, which are assigned to said user graphic environment data at the transmitting side, are distinguished from PIDs each assigned to the video information, the audio information and the additional information.

6. The graphic interface device according to claim 5, wherein different PIDs are assigned to different user graphic environments.

7. The graphic interface device according to claim 4, wherein the graphic interfacing side includes:

a demultiplexor for receiving a transport stream through the receiving side and demultiplexing the transport stream to separate the transport stream into the video information, the audio information, the additional information and the user graphic environment data;

a controller for controlling the demultiplexing of said demultiplexor and inputting and decoding the user graphic environment data separated in said demultiplexor;

a memory for storing the user graphic environment data decoded in said controller;

a graphic processor for performing a graphic process for the user graphic environment data stored in said memory under a control of said controller; and a display processor for processing the user graphic environment data processed in said graphic processor to be matched in an output format of a display unit to display the processed information on the display unit.

8. The graphic interface device according to claim 7, further comprising a code processor for inputting and decoding the user graphic environment data which has not been decoded in said controller and storing the decoded information in said memory.

9. The graphic interface device according to claim 7, wherein said controller controls said demultiplexor in order to parse only a data stream of a specific user graphic environment, if the specific user graphic environment from the various forms of user graphic environments displayed on a display unit has been selected by the user.

10. The graphic interface device according to claim 7, wherein said graphic processor performs a graphic user interface (GUI) process for the user graphic environment data stored in said memory and said display processor displays the GUI-processed information on the display unit in an on-screen display (OSD) fashion.

11. A graphic interface method usable in a digital TV, comprising the steps of:

receiving user graphic environment data corresponding to various forms of user graphic environments [displayable on a screen] from a transmitting side, the user graphic environment data including icon data corresponding to various icons;

[parsing and decoding] *processing* the user graphic environment data received at a receiving side, and allowing an end user to design a user-preferred user graphic environment including at least one user-defined icon [using the user graphic environment data];

displaying an environment set menu, such that any one of the various forms of user graphic environments can be selected by the end user, wherein said user graphic environment data are assigned with specific packet identifications (PIDs), and said displaying step comprises the steps of:

if a menu icon, in the environment set menu which can be selected by the end user, has been selected by the end user, parsing a data stream associated with the PIDs corresponding to various forms of menu icons;

decoding the parsed stream to store the various forms of menu icons in a memory;

performing a graphical user interface (GUI) process for the various forms of menu icons and text type of indication menu names which are to be set as the menu icons to be displayed in a menu fashion;

if respective ones of the various forms of menu icons and the indication menu names have been selected by the end user, parsing a stream associated with the PID assigned to the selected icon;

decoding the parsed stream to store the corresponding icon in the memory; and replacing the selected indication menu name with the corresponding icon and displaying the replaced icon.

12. The graphic interface method according to claim 11, wherein said user graphic environment data include program guide pattern data corresponding to various forms of program guide patterns.

13. The graphic interface method according to claim 11, wherein said user graphic environment data are assigned with specific packet identifications (PIDs), and said displaying step comprises the steps of:

if a program guide, in the environment set menu which can be selected by the end user, has been selected by the end user, parsing a data stream associated with the PIDs corresponding to various forms of program guide patterns;

decoding the parsed stream to store the various forms of program guide patterns in a memory;

performing a graphical user interface (GUI) process for the various forms of program guide patterns to be displayed in an on-screen-display (OSD) fashion;

if any one of the various forms of program guide patterns has been selected by the end user, parsing a stream associated with the PID assigned to the selected program guide pattern;

decoding the parsed stream to store the corresponding program guide pattern in the memory; and displaying the corresponding program guide pattern stored in the memory in the OSD fashion.

14. The graphic interface method according to claim 13, wherein said displaying step for displaying the corresponding program guide pattern displays additional information related to channel and program through link on the displayed program guide pattern.

15. The graphic interface method according to claim 11, wherein said step of selecting the respective ones of the various forms of menu icons and indication menu names and said steps of replacing the selected indication menu name with the selected icon and displaying the replaced icon are all performed in a repetitive manner by the selection of the user.

16. The graphic interface device according to claim 2, wherein the graphic interfacing side is configured to display a series of menus on the screen for allowing the end user to design the user-preferred user graphic environment.

17. The graphic interface device according to claim 16, wherein the graphic interfacing side replaces at least a portion of a text-based user graphic environment with icons whose representative functions have been defined by the end user using the series of menus to design the user-preferred user graphic environment.

18. The graphic interface device according to claim 17, wherein the text-based user graphic environment is in a particular program guide pattern selected by the end user from the various forms of program guide patterns using the series of menus to design the user-preferred user graphic environment.

19. The graphic interface device according to claim 1, wherein the user-preferred user graphic environment is a user-selected program guide having a portion of its text replaced with icons whose representative functions have been defined by the end user.

20. The graphic interface method according to claim 11, further comprising:

displaying a series of menus on a screen for allowing the end user to design the user-preferred user graphic environment.

21. The graphic interface method according to claim 20, further comprising:

replacing at least a portion of a text-based user graphic environment with icons whose representative functions have been defined by the end user using the series of menus, to design the user-preferred user graphic environment.

* * * * *